United States Patent
Buran et al.

[15] 3,683,178
[45] Aug. 8, 1972

[54] APPARATUS FOR DETERMINING THE DIRECTION OF FLOW OF AN IONIZABLE FLUID

[72] Inventors: Vojtech Buran, Brno; Jaromir Kuba, Troubsko U Brna; Adolf Uncovsky; Karel Zouhar, both of Brno, all of Czechoslovakia

[73] Assignee: Vyzkumny a vyvojovy ustav Zavodu vseobecneho strojirenstvi, Brno, Czechoslovakia

[22] Filed: Jan. 4, 1971

[21] Appl. No.: 103,780

Related U.S. Application Data

[63] Continuation-in-part of Ser. No. 827,397, May 23, 1969, abandoned.

[30] Foreign Application Priority Data

May 21, 1968 Czechoslovakia.........3696/68

[52] U.S. Cl......................250/43.5 FC, 250/83.6 FT
[51] Int. Cl..............................................G01n 23/12
[58] Field of Search......250/43.5 FC, 43.5 MR, 44, 83.6 FT

[56] References Cited

UNITED STATES PATENTS 2,627,543   2/1953   Obepmaier.....250/43.5 FC X
2,934,648   4/1960   Leupi et al........250/43.5 R X Primary Examiner—James W. Lawrence
Assistant Examiner—Davis L. Willis
Attorney—Arthur O. Klein

[57] ABSTRACT

An arrangement for determining the direction of flow of an ionizable gas along a prescribed axial path employs a conductive, open-ended ionization chamber positioned in the path of flow of the gas. An open-ended, toroidal source of ionization radiation is positioned concentrically within the chamber to ionize the gas flowing therethrough. A pair of spaced cylindrical electrodes are disposed concentrically within the chamber with their central axis planes respectively positioned on opposite sides of the central axial plane of the ionization source. The ionization current generated when the gas is ionized is measured by a pair of meters which are respectively coupled between the individual electrodes and the common chamber wall. For any given direction of gas flow through the chamber, the meters will register different ionization current values, the sense of the difference being indicative of the direction of gas flow.

3 Claims, 3 Drawing Figures

PATENTED AUG 8 1972　　3,683,178

INVENTORS:
Vojtech BURAN
Jaromir KUBA
Adolf UNCOVSKY
Karel ZOUHAR

BY: Arthur C. Klein
ATTORNEY

APPARATUS FOR DETERMINING THE DIRECTION OF FLOW OF AN IONIZABLE FLUID

This application is a continuation-in-part of application Ser. No. 827,397, filed May 23, 1969 and now abandoned.

BACKGROUND OF THE INVENTION

It is known to measure a quantity proportional to the velocity of flow of an ionizable gas or other fluid with the use of suitable ionization apparatus and associated detectors. Illustratively, the gas flow is directed through a hollow, open-ended ionization chamber whose wall is conductive to form a first electrode of the detecting arrangement. A suitable toroidal source of ionization radiation is mounted concentrically within the chamber so that the gas is ionized as it passes through the source. A second elongated cylindrical electrode is disposed concentrically within the chamber, with the central axial plane of the second electrode being aligned with the central axial plane of the source so that the second electrode is symmetrically located within the source. The amplitude of the ionization current in the chamber which is measured by a suitable meter connected between the second electrode and the chamber wall, is indicative of the velocity of the flowing gas.

This arrangement is effective to indicate the velocity of gas flow in either of the two opposite axial directions through the ionization chamber. Unfortunately, however, it is incapable of indicating which of the two opposite directions the flow is coming from at any given time. Such latter information may be important in certain high risk situations, as where a reverse or back-up flow of gas may signify a danger of explosion in chemical plants, mines, or the like.

SUMMARY OF THE INVENTION

This drawback is eliminated with an illustrative arrangement in accordance with the invention, in which the aforementioned velocity-measuring arrangement for a flowing ionizable gas is modified by asymmetrically positioning the second electrode within the chamber so that the central axial plane of the second electrode is axially displaced in a first direction from the central axial plane of the ionizing source.

With this arrangement, the ionization current through the meter when the gas flow is in the first direction is greater than the current when the gas flow is in the opposite direction. This is primarily because ionized gas particles tend to be carried to the surface of the second electrode by the moving gas stream when the latter is flowing in the first direction, thereby enhancing the ionization current flow. On the other hand, such ionized particles tend to be carried away from the second electrode surface by the moving gas stream when the flow is in the opposite direction, so that such ions cannot contribute to the current through the meter.

Employing this principle, a pair of the second electrodes may be disposed concentrically in axially spaced relation within the chamber. The central axial planes of the second electrodes are respectively displaced in first and second opposite axial directions from the central axial plane of the source. As a result, the ionization current between the chamber wall and the second electrode which is displaced in the first direction will be greater than the current flow between the chamber wall and the other second electrode when the gas flow is in the first direction. This effect is reversed when the gas flow is in the opposite direction.

A pair of separate meters may be employed to simultaneously detect the ionization current flow between the individual second electrodes and the common chamber wall. Alternatively, if desired, a single meter can be employed for the comparative current measurement. In this latter case, a suitable switch may be used to alternately couple the meter between the chamber wall and each of the respective second electrodes.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
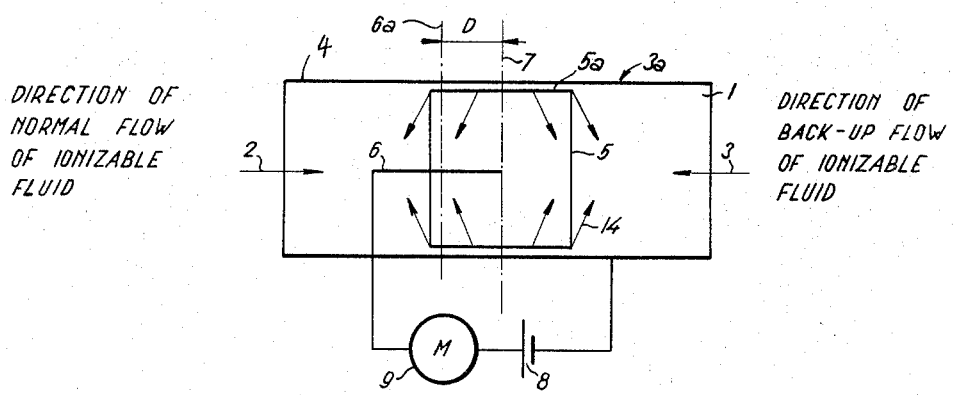
FIG. 1 is a pictorial diagram of a measuring apparatus in accordance with the invention, illustrating an electrode positioning scheme for determining the direction of flow of an ionized fluid.

Referring now to the drawing, FIG. 1 illustrates an apparatus employing the principles of the invention for sensing the direction of flow of an ionizable fluid, illustratively a gas. The fluid is assumed to be normally flowing in an axial direction from left to right represented by an arrow 2 but may also flow under certain conditions (as in the back-up flow situation mentioned above) in the opposite right to left axial direction represented by an arrow 3.

The apparatus comprises a hollow, cylindrical, open-ended tube 3a having a conductive wall 4 and serving as an ionization chamber. (The tube 3a will hereafter be sometimes referred to as the "chamber 3a"). The chamber 3a is positioned as shown in the axial path of fluid flow so that the fluid can pass therethrough. A toroidal source 5 of ionization radiation having a toroidal wall 5a of cylindrical longitudinal section, is disposed concentrically within the chamber 3a for ionizing the gas flowing through the chamber. The source 5 may be of any conventional design.

The source 5 may be positioned close to but spaced from tube 3a, as shown, or may be mounted upon the inner wall of tube 3a by an electrically insulating mounting means, not shown, which blocks the flow of gas between source 5 and the tube. In either construction, at least substantially all of the gas flowing through tube 3a is ionized by source 5.

Source 5 is a common alpha or beta radiation source of industrial execution, e.g. Americium 241 type AMM4 or Prometheum 147 type PMC 14 (from the catalogue of the supplier, The Radiochemical Center, Amersham, G.B., from the year 1969/1970). This radiation source is in the form of a toroid-cylindrical ring arranged on the inner surface of a hollow electrode, so that the ionizing radiation is directed to the longitudinal axis of the hollow electrode and ionizes the fluid in the whole section of the hollow electrode. The highest degree of ionization is in the cavity of the toroid and it diminishes in the direction to one and the other open end of the hollow electrode. The rays coming out of the cylindrical part of the toroid 5 in the direction towards the axis of the hollow electrode are depicted by arrows 14.

A cylindrical electrode 6 is positioned coaxially within the chamber 3a and the source 5 for measuring the ionization current which occurs when the gas flowing through the chamber is acted upon by radiation from a source. A path for such ionization current extends from the electrode 6 through a suitable ionization current member 9, a battery 8, and the conductive wall 4 of the chamber 3a.

The electrode 6 is asymmetrically positioned within the source 5 in such a manner that a central axial plane 6a of the electrode is displaced by a distance D from a central axial plane 7 of the source 5 in the direction of the arrow 3. Because of this asymmetrical placement of the electrode 6, ionized particles will tend to be carried to the surface of the electrode 6 by the moving gas when the latter is directed in accordance with the arrow 3, thereby enhancing the ionization current flow through the meter 9. On the other hand, such ionized particles tend to be carried away from the surface of the electrode 6 by the moving gas stream when the latter is directed in accordance with the arrow 2, thereby diminishing the effective ionization current flow through the meter 9. Thus the asymmetrical placement of the electrode 6 to the left of the central axial plane 7 will cause the meter 9 to read a higher amplitude when the gas flow is to the left in the direction of the arrow 3 than when the gas flow is to the right in the direction of the arrow 2.

Figure 2:
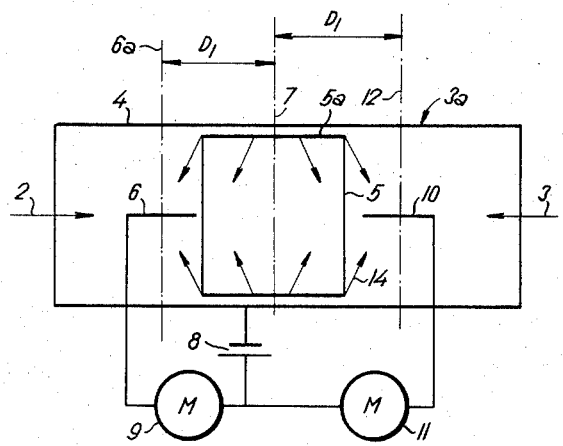
FIG. 2 is a pictorial diagram of an arrangement similar to FIG. 1, but employing an additional electrode together with means for simultaneously detecting the ionization current amplitudes through the respective electrodes.

FIG. 2 shows a complete illustrative embodiment of a directional sensing apparatus employing the principles described above in connection with FIG. 1. Corresponding parts of FIGS. 1 and 2 have been given corresponding reference numerals. In FIG. 2, an additional electrode 10 has been provided for measuring ionization current flow through a path including a second meter 11, the battery 8, and the conductive wall 4 of the chamber 3a. As shown, the central axial plane 6a of the electrode 6 is displaced to the left of the central axial plane 7 of the source 5 by a distance $D_1$, while a central axial plane 12 of the electrode 10 is also displaced from the central plane 7 by the same distance $D_1$ but in the opposite direction i.e., to the right as viewed in the figure.

Because of the asymmetric positioning of each of the electrodes 6 and 10 with respect to the source 5, the electrode 6 will, as in FIG. 1, be subjected to a higher net amplitude of ionization current when the gas flow is in the direction 3 than when it is in the direction 2. Similarly, the electrode 10 will be subjected to ionization current which is greater in amplitude when the flow of gas is in the direction 2 than when it is in the direction 3. If the meters 9 and 11 are identical, the meter 11 will register a higher level than the meter 9 when the direction of gas is in the direction of the arrow 2. Similarly, during a reverse or "back up" flow of gas in the direction of the arrow 3, the meter 9 will register a higher level than the meter 11.

While not specifically illustrated in the drawing, it will be apparent that either of the meters 9 or 11 can be employed to measure the velocity of the flowing gas in a conventional manner by moving the associated electrode 6 or 10 so that the latter is symmetrically positioned with respect to the central plane 7 of the source 5. In such a case, the meter reading will be the same irrespective of the direction of flow of the gas. Moreover, it will be apparent from FIG. 2 that for any given direction of gas flow, the meters 9 and 11 will respectively indicate ionization current levels that are displaced in opposite senses from the level each would read if the associated electrode were symmetrically positioned within the source 5. Thus, the actual velocity of the gas passing through the chamber 3a is approximately propertional to the average of the readings on the meters 9 and 11.

Figure 3:
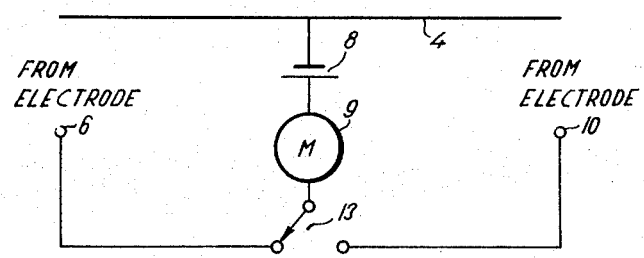
FIG. 3 is a pictorial diagram of a modified form of the arrangement of FIG. 2, in which the ionization current amplitudes through the respective electrodes are alternately detected.

FIG. 3 shows an alternative way of connecting a single meter (illustratively the meter 9) to measure the current picked up be either one of the electrodes 6 and 10 of FIG. 2. A manually operated switch 13 (FIG. 3) is serially connected with the meter 9 and the battery 8 for selectively reading the current in the path of a selected one of the electrodes 6 and 10. The movable switch contactor is moved from electrode 6 to electrode 10 to determine the position in which the meter indicates the higher level; the direction of gas flow is then determined in the manner described above in connection with FIG. 2.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. Apparatus for determining the direction of flow of an ionizable fluid which can flow in either one of two opposite axial directions, which comprises:

a first open-ended, hollow electrode disposed axially in the path of flow of the fluid;

an open-ended, elongated, toroidal source of ionization radiation disposed concentrically within the first electrode for ionizing the fluid flowing through the first electrode;

second and third axially spaced, elongated cylindrical electrodes disposed concentrically within the first electrode, the central axial planes of the second and third electrodes being respectively displaced in first and second axially opposite directions from the central axial plane of the source; and means for separately detecting the amplitudes of ionization current flowing between the first and second electrodes and between the first and third electrodes, respectively, when the fluid is ionized by the source, the amplitude of the current between the first and second electrodes being greater when the fluid flow is in the first direction and the current between the first and third electrodes being the greater when the fluid flow is in the second direction.

2. Apparatus as defined in claim 1, in which the detecting means comprises, in combination, a first ionization current meter interconnecting the first and second electrodes, and a second ionization current meter interconnecting the first and third electrodes.

3. Apparatus as defined in claim 1, in which the detecting means comprises, in combination, an ionization current meter; means for connecting one terminal of the meter to the first electrode; and switching means selectively interconnecting the second and third electrodes to the other terminal of the meter.

* * * * *